US009731481B2

(12) United States Patent
Oguro et al.

(10) Patent No.: US 9,731,481 B2
(45) Date of Patent: Aug. 15, 2017

(54) SYNTHETIC RESIN LAMINATE

(75) Inventors: Hiroki Oguro, Kanagawa (JP); Nobuyuki Koike, Kanagawa (JP); Yoshio Aoki, Kanagawa (JP); Kazuya Sato, Kanagawa (JP); Toshinari Aoki, Kanagawa (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 706 days.

(21) Appl. No.: 13/697,882

(22) PCT Filed: May 17, 2011

(86) PCT No.: PCT/JP2011/061348
§ 371 (c)(1),
(2), (4) Date: Nov. 14, 2012

(87) PCT Pub. No.: WO2011/145630
PCT Pub. Date: Nov. 24, 2011

(65) Prior Publication Data
US 2013/0059158 A1 Mar. 7, 2013

(30) Foreign Application Priority Data

May 21, 2010 (JP) .................................. 2010-117415

(51) Int. Cl.
B32B 27/08 (2006.01)
B32B 27/30 (2006.01)
B32B 27/36 (2006.01)

(52) U.S. Cl.
CPC ............ B32B 27/308 (2013.01); B32B 27/08 (2013.01); B32B 27/365 (2013.01); *Y10T 428/31507* (2015.04)

(58) Field of Classification Search
CPC ..... B32B 27/08; B32B 27/308; B32B 27/365; B32B 27/302; B32B 2551/00; B32B 2605/006; B32B 2325/00; B32B 2333/08; B32B 2333/12; B32B 2369/00; B32B 2307/412; C08F 20/14; C08F 212/34; C08F 120/14; C08F 212/08; C08F 8/04; C08F 220/14; C09D 125/16; C09D 133/08; C09D 133/10; C09D 133/12; C09D 135/06
USPC ...... 428/412, 500; 524/577, 560; 526/329.7, 526/319, 329.2, 346
See application file for complete search history.

(56) References Cited

U.S. PATENT DOCUMENTS

| 5,804,287 | A | 9/1998 | Hatakeyama et al. |
| 5,904,976 | A | 5/1999 | Berry et al. |
| 9,085,647 | B2 * | 7/2015 | Saegusa .............. B29C 47/0021 |
| 2008/0213606 | A1 * | 9/2008 | Saegusa et al. .............. 428/500 |
| 2011/0244242 | A1 | 10/2011 | Oguro et al. |

FOREIGN PATENT DOCUMENTS

| CN | 1139406 | 1/1997 |
| JP | 58-50197 | 11/1983 |
| JP | 5-96692 | 4/1993 |
| JP | 8-323934 | 12/1996 |
| JP | 9-328592 | 12/1997 |
| JP | 3489972 | 1/2004 |
| JP | 2005-225108 | 8/2005 |
| JP | 2008-209723 | 9/2008 |
| JP | 2009-196125 | 9/2009 |
| WO | 2010/024217 | 3/2010 |

OTHER PUBLICATIONS

Machine translation of JP 2009196125 A, retrieved Jul. 16, 2014.*
Poly(styrene-co-methyl methacrylate), retrieved Jul. 17, 2014.*
U.S. Appl. No. 13/642,936 to Yoshio Aoki et al., filed Oct. 23, 2012.
U.S. Appl. No. 13/704,827 to Kazuya Sato et al., filed Dec. 17, 2012.
U.S. Appl. No. 13/814,323 to Kazuya Sato et al., filed Feb. 5, 2013.
Search report from International Application No. PCT/JP2011/061348, mail date is Aug. 16, 2011.
China Office Action in CN 2011800250162 (see especially search report at pp. 5,6), mail date is Mar. 24, 2014.

* cited by examiner

*Primary Examiner* — Callie Shosho
*Assistant Examiner* — Krupa Shukla
(74) *Attorney, Agent, or Firm* — Greenblum & Bernstein, P.L.C.

(57) ABSTRACT

A synthetic resin laminate for use for transparent substrate materials and transparent protective materials is excellent in interlayer adhesiveness, form stability in high-temperature and high humidity environments, surface hardness and impact resistance. The synthetic resin laminate has a vinyl copolymer resin (A) layer and a polycarbonate resin (B) layer, wherein layer (A) is directly laminated on one surface of layer (B), and in which (A) contains a (meth)acrylate structural unit (a) represented by a specific formula and an aliphatic vinyl structural unit (b) represented by a specific formula, the total proportion of the (meth)acrylate structural unit (a) and the aliphatic vinyl structural unit (b) is from 90 to 100 mol % relative to the total of all the structural units in (A), and the proportion of the (meth)acrylate structural unit (a) is from 65 to 80 mol % relative to the total of all the structural units in (A).

7 Claims, No Drawings

SYNTHETIC RESIN LAMINATE

TECHNICAL FIELD

The present invention relates to a synthetic resin laminate, and precisely to a synthetic resin laminate for use for transparent substrate materials and transparent protective materials, which has a polycarbonate resin layer and a vinyl copolymer resin layer having a specific structure and is excellent in interlayer adhesiveness, form stability in high-temperature high-humidity environments, surface hardness and impact resistance.

BACKGROUND ART

A polycarbonate resin plate is excellent in transparency and impact resistance and is used for soundproof bulkheads, carports, signboards, glazing materials, etc. Recently, a laminate produced by laminating an acrylic resin excellent in transparency and surface hardness on a polycarbonate, for example, as described in Patent Reference 1, has been applied to front panels of information display instruments, etc. However, the laminate of the type may often warp greatly owing to the difference in the water absorption characteristics between the acrylic resin and the polycarbonate resin and in the heat resistance such as typically glass transition temperature therebetween, and may often bring about some problems depending on the way of its use.

Patent Reference 2 discloses a laminate produced by laminating a resin having a low water absorption on a polycarbonate resin for preventing the laminate from warping. However, in a high-temperature high-humidity environment at a temperature of 85° C. and a relative humidity of 85%, the laminate may often warp greatly owing to the moisture absorption by the polycarbonate resin. The resin having a low water absorption is poorly hydrophilic and may therefore cause interlayer delamination from the surface coat in hard coat treatment, antireflection treatment, antifouling treatment or antiglare treatment or may create a surface hardness shortage, therefore often bringing about some problems depending on the way of its use.

Patent Reference 3 illustrates a laminate produced by laminating a vinyl copolymer resin having a specific (meth)acrylate structural unit and a polycarbonate resin, and excellent in impact resistance, heat resistance, weather resistance and scratch resistance, but the laminate may often cause interfacial delamination depending on the condition in its use.

A laminate that contains an acrylic resin layer laminated on both surfaces of a polycarbonate resin layer is known; however, when one surface of the laminate is given plane impact applied thereto, the acrylic resin layer on the other side thereof may readily crack, therefore often bringing about some problems depending on the way of its use.

CITATION LIST

Patent References

Patent Reference 1: Japanese Patent No. 3489972
Patent Reference 2: JP-A 2005-225108
Patent Reference 3: JP-A 2009-196125

SUMMARY OF THE INVENTION

Problems that the Invention is to Solve

Given the situation as above, an object of the present invention is to provide a synthetic resin laminate which is for use for transparent substrate materials and transparent protective materials and is excellent in interlayer adhesiveness, form stability in high-temperature high-humidity environments, surface hardness and impact resistance.

Means for Solving the Problems

The present inventors have assiduously studied for the purpose of solving the above-mentioned problems and, as a result, have found that a synthetic resin laminate produced by laminating a vinyl copolymer resin having a specific structure on one surface of a polycarbonate resin layer can satisfy the above-mentioned characteristics, and have reached the present invention.

Specifically, the present invention provides a synthetic resin laminate mentioned below, and a transparent material using the synthetic resin laminate.

1. A synthetic resin laminate having a vinyl copolymer resin (A) layer and a polycarbonate resin (B) layer, in which the layer (A) is directly laminated on one surface of the layer (B) and in which the vinyl copolymer resin (A) contains a (meth)acrylate structural unit (a) represented by the following general formula (1) and an aliphatic vinyl structural unit (b) represented by the following general formula (2), the total proportion of the (meth)acrylate structural unit (a) and the aliphatic vinyl structural unit (b) is from 90 to 100 mol % relative to the total of all the structural units in the vinyl copolymer resin (A), and the proportion of the (meth)acrylate structural unit (a) is from 65 to 80 mol % relative to the total of all the structural units in the vinyl copolymer resin (A).

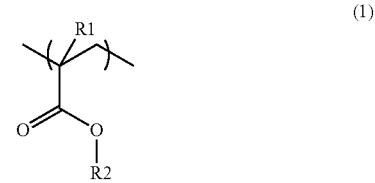

(1)

(In the formula, R1 represents a hydrogen atom or a methyl group; R2 represents an alkyl group having from 1 to 18 carbon atoms.)

(2)

(In the formula, R3 represents a hydrogen atom or a methyl group; R4 represents a cyclohexyl group optionally having a hydrocarbon substituent with from 1 to 4 carbon atoms.)

2. The synthetic resin laminate described in the above 1, wherein the vinyl copolymer resin (A) is one obtained through polymerization of at least one (meth)acrylate monomer and at least one aromatic vinyl monomer followed by hydrogenation of at least 70% of the aromatic double bonds derived from the aromatic vinyl monomer.
3. The synthetic resin laminate described in the above 1 or 2, wherein in the above-mentioned general formula (1), R1 and R2 are methyl groups.
4. The synthetic resin laminate described in any of the above 1 to 3, wherein in the above-mentioned general formula (2), R3 is a hydrogen atom and R4 is a cyclohexyl group.

5. The synthetic resin laminate described in any of the above 1 to 4, wherein the vinyl copolymer resin (A) and/or the polycarbonate resin (B) contain a UV absorbent.
6. The synthetic resin laminate described in any of the above 1 to 5, wherein the vinyl copolymer resin (A) layer is processed for hard coat treatment.
7. The synthetic resin laminate described in any of the above 1 to 5, wherein the vinyl copolymer resin (A) layer and the polycarbonate resin (B) layer are processed for hard coat treatment.
8. The synthetic resin laminate described in any of the above 1 to 7, of which one surface or both surfaces are processed for at least one treatment selected from antireflection treatment, antifouling treatment, antistatic treatment, weatherproof treatment and antiglare treatment.
9. A transparent substrate material containing the synthetic resin laminate described in any of the above 1 to 8.
10. A transparent protective material containing the synthetic resin laminate described in any of the above 1 to 8.

Advantage of the Invention

According to the present invention, there is provided a synthetic resin laminate excellent in form stability in high-temperature high-humidity environments, surface hardness and impact resistance, and the synthetic resin laminate is used for transparent substrate materials and transparent protective materials. Concretely, the laminate is favorably used for cell-phone units, portable electronic game devices, handheld terminals, portable display devices of mobile PCs or notebook-size PCs, as well as stationary display devices such as desktop PC liquid-crystal monitors or liquid-crystal televisions.

MODE FOR CARRYING OUT THE INVENTION

The synthetic resin laminate of the present invention has a vinyl copolymer resin (A) layer and a polycarbonate resin (B) layer, in which the vinyl copolymer resin (A) layer is directly laminated on one surface of the polycarbonate resin (B) layer and in which the vinyl copolymer resin (A) contains a (meth)acrylate structural unit (a) represented by the following general formula (1) and an aliphatic vinyl structural unit (b) represented by the following general formula (2), the total proportion of the (meth)acrylate structural unit (a) and the aliphatic vinyl structural unit (b) is from 90 to 100 mol % relative to the total of all the structural units in the vinyl copolymer resin (A), and the proportion of the (meth)acrylate structural unit (a) is from 65 to 80 mol % relative to the total of all the structural units in the vinyl copolymer resin (A).

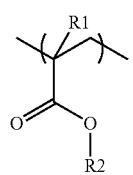

(1)

(In the formula, R1 represents a hydrogen atom or a methyl group; R2 represents an alkyl group having from 1 to 18 carbon atoms.)

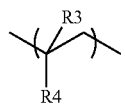

(2)

(In the formula, R3 represents a hydrogen atom or a methyl group; R4 represents a cyclohexyl group optionally having a hydrocarbon substituent with from 1 to 4 carbon atoms.)

In the synthetic resin laminate of the present invention, the vinyl copolymer resin (A) layer is laminated on one surface alone of the polycarbonate resin (B) layer. When the vinyl copolymer resin (A) layer is laminated on one surface alone and in case where the side of the vinyl copolymer resin (A) layer having a hard structure is given plane impact applied thereto, then the polycarbonate resin (B) layer having a soft structure on the opposite side could absorb the impact and therefore the laminate is broken little by the impact. On the other hand, a laminate in which the vinyl copolymer resin (A) layer is laminated on both surfaces of the polycarbonate resin (B) layer is unfavorable since the impact would be readily broken by plane impact given to one surface thereof because the opposite surface thereof is the vinyl copolymer resin (A) layer having a hard structure.

In the (meth)acrylate structural unit represented by the above-mentioned general formula (1), R2 represents an alkyl group having from 1 to 18 carbon atoms, concretely including a methyl group, an ethyl group, a butyl group, a lauryl group, a stearyl group, a cyclohexyl group, an isobornyl group, etc.

Of the (meth)acrylate ester structural units, preferred is a (meth)acrylate structural unit in which R2 is a methyl group and/or an ethyl group, and more preferred is a methyl methacrylate structural unit in which R1 is a methyl group and R2 is a methyl group.

The aliphatic vinyl structural unit represented by the above-mentioned general formula (2) includes, for example, those in which R3 is a hydrogen atom or a methyl group, and R4 is a cyclohexyl group, or a cyclohexyl group having a hydrocarbon substituent with from 1 to 4 carbon atoms.

Of the aliphatic vinyl structural units, preferred is an aliphatic vinyl structural unit in which R3 is a hydrogen atom and R4 is a cyclohexyl group.

The vinyl copolymer resin (A) for use in the present invention contains mainly the (meth)acrylate structural unit (a) represented by the above-mentioned general formula (1) and the aliphatic vinyl structural unit (b) represented by the above-mentioned general formula (2). The vinyl copolymer resin (A) may contain one or more such (meth)acrylate structural units (a), and may contain one or more such aliphatic vinyl structural units (b).

The total proportion of the (meth)acrylate structural unit (a) and the aliphatic vinyl structural unit (b) is from 90 to 100 mol % relative to the total of all the structural units in the vinyl copolymer resin (A), preferably from 95 to 100 mol %, more preferably from 98 to 100 mol %.

Namely, the vinyl copolymer resin (A) may contain any other structural unit than the (meth)acrylate structural unit (a) and the aliphatic vinyl structural unit (b) within a range of at most 10 mol % relative to the total of all the structural units therein.

The other structural unit than the (meth)acrylate structural unit (a) and the aliphatic vinyl structural unit (b) includes, for example, a structural unit that is derived from the aromatic vinyl monomer containing an unhydrogenated aromatic double bond in the vinyl copolymer resin (A) obtained through polymerization of a (meth)acrylate monomer and an aromatic vinyl monomer followed by hydrogenation of the aromatic double bond derived from the aromatic vinyl monomer.

The proportion of the (meth)acrylate structural unit (a) represented by the above-mentioned general formula (1) is from 65 to 80 mol % relative to the total of all the structural units in the vinyl copolymer resin (A), preferably from 70 to 80 mol %.

When the proportion of the (meth)acrylate structural unit (a) relative to the total of all the structural units in the vinyl copolymer resin (A) is less than 65 mol %, then the adhesiveness of the resin to the polycarbonate resin (B) and the surface hardness thereof may lower and the laminate may be impracticable. When the proportion is more than 80 mol %, the laminate may warp through water absorption and may be impracticable.

The production method for the vinyl copolymer resin (A) is not specifically defined. Preferred is one obtained through polymerization of at least one (meth)acrylate monomer and at least one aromatic vinyl monomer followed by hydrogenation of the aromatic double bond derived from the aromatic vinyl monomer. (Meth)acrylic acid means methacrylic acid and/or acrylic acid.

The aromatic vinyl monomer to be used in the case concretely includes styrene, α-methylstyrene, p-hydroxystyrene, alkoxystyrene, chlorostyrene, and their derivatives, etc. Of those, preferred is styrene.

For polymerization of the (meth)acrylate monomer and the aromatic vinyl monomer, any known method is usable. For example, the resin may be produced according to a bulk polymerization method, solution polymerization method, etc.

The bulk polymerization method is, for example, a method where a monomer composition containing the above-mentioned monomers and a polymerization initiator is continuously fed into a complete mixing tank and the monomers are continuously polymerized at 100 to 180° C. The monomer composition may contain, if desired, a chain transfer agent.

Not specifically defined, the polymerization initiator includes organic peroxides such as t-amyl peroxy-2-ethylhexanoate, t-butyl peroxy-2-ethylhexanoate, benzoyl peroxide, 1,1-di(t-hexylperoxy)-3,3,5-trimethylcyclohexane, 1,1-di(t-hexylperoxy)cyclohexane, 1,1-di(t-butylperoxy)cyclohexane, t-hexylperoxy-isopropyl-monocarbonate, t-amyl peroxy-normal-octoate, t-butyl peroxy-isopropyl-monocarbonate, di-t-butyl peroxide, etc.; and azo compounds such as 2,2'-azobisisobutyronitrile, 2,2'-azobis(2-methylbutyronitrile), 2,2'-azobis(2,4-dimethylvaleronitrile), etc. One alone or two or more different types of these may be used here either singly or as combined.

A chain transfer agent may be used optionally, and includes, for example, α-methylstyrene dimer.

The solvent usable in the solution polymerization method includes, for example, hydrocarbon solvents such as toluene, xylene, cyclohexane, methylcyclohexane, etc.; ester solvents such as ethyl acetate, methyl isobutyrate, etc.; ketone solvents such as acetone, methyl ethyl ketone, etc.; ether solvents such as tetrahydrofuran, dioxane, etc.; alcohol solvents such as methanol, isopropanol, etc.

The solvent for use in the hydrogenation after the polymerization of the (meth)acrylate monomer and the aromatic vinyl monomer may be the same as or different from the above-mentioned polymerization solvent. For example, there are mentioned hydrocarbon solvents such as cyclohexane, methylcyclohexane, etc.; ester solvents such as ethyl acetate, methyl isobutyrate, etc.; ketone solvents such as acetone, methyl ethyl ketone, etc.; ether solvents such as tetrahydrofuran, dioxane, etc.; alcohol solvents such as methanol, isopropanol, etc.

After the (meth)acrylate monomer and the aromatic vinyl monomer are polymerized in the manner as above, the aromatic vinyl monomer-derived aromatic double bond is hydrogenated to give the vinyl copolymer resin (A) for use in the present invention.

The hydrogenation method is not specifically defined, and any known method is employable here. For example, the hydrogenation may be attained in a batch mode or a continuous flow mode under a hydrogen pressure of from 3 to 30 MPa and at a reaction temperature of from 60 to 250° C. At a temperature not lower than 60° C., the reaction would not take too much time; and at a temperature not higher than 250° C., the molecular chain may be cut little or the ester moiety may be hydrogenated little.

As the catalyst to be used for the hydrogenation, there may be mentioned a solid catalyst that carries a metal such as nickel, palladium, platinum, cobalt, ruthenium, rhodium or the like, or an oxide, a salt or a complex compound of such a metal, as supported by a porous carrier such as carbon, alumina, silica, silica/alumina, diatomaceous earth or the like.

Preferably, in the vinyl copolymer resin (A), at least 70% of the aromatic double bonds derived from the aromatic vinyl monomer are hydrogenated. Namely, the proportion of the unhydrogenated aromatic double bonds in the structural unit derived from the aromatic vinyl monomer is at most 30%. When the proportion is more than 30%, then the transparency of the vinyl copolymer resin (A) may lower. More preferably, the proportion is less than 10%, even more preferably less than 5%.

Not specifically defined, the weight-average molecular weight of the vinyl copolymer resin (A) is preferably from 50,000 to 400,000 from the viewpoint of the strength and the moldability thereof, more preferably from 70,000 to 300,000.

The weight-average molecular weight is a standard polystyrene-equivalent weight-average molecular weight to be measured through gel permeation chromatography (GPC).

The vinyl copolymer resin (A) may be blended with any other resin in a range not detracting from the transparency thereof. For example, there are mentioned methyl methacrylate-styrene copolymer resin, polymethyl methacrylate, polystyrene, polycarbonate, cycloolefin (co)polymer resin, acrylonitrile-styrene copolymer resin, acrylonitrile-butadiene-styrene copolymer resin, various elastomers, etc.

Preferably, the glass transition temperature of the vinyl copolymer resin (A) is within a range of from 110 to 140° C. When the glass transition temperature is 110° C. or higher, the laminate that the present invention provides here would be deformed or cracked little in heat environments or in wet heat environments; and when 140° C. or lower, the laminate would be excellent in workability in continuous thermal forming with a mirror-surface roll or a forming roll or in batch thermal forming with a mirror-surface mold or a forming mold. The glass transition temperature in the present invention is one measured with a differential scanning calorimeter, in which 10 mg of the sample to be analyzed is heated at a heating rate of 10° C./min and the glass transition temperature thereof is measured according to the midpoint method.

The polycarbonate resin (B) for use in the present invention is not specifically defined, for which employable here is a polymer produced from a bisphenol compound according to a known method. For example, there are mentioned carbonate polymers and others obtained through interesterification of a carbonic diester with 2,2-bis(4-hydroxyphenyl) propane.

In the present invention, the vinyl copolymer resin (A) and/or the polycarbonate resin (B) may contain a UV absorbent. The UV absorbent includes, for example, benzophenone-type UV absorbents such as 2,4-dihydroxybenzophenone, 2-hydroxy-4-methoxybenzophenone, 2-hydroxy-4-n-octoxybenzophenone, 2-hydroxy-4-dodecyloxybenzophenone, 2-hydroxy-4-octadecyloxybenzophenone, 2,2'-dihydroxy-4-methoxybenzophenone, 2,2'-dihydroxy-4,4'-dimethoxybenzophenone, 2,2',4,4'-tetrahydroxybenzophenone, etc.; benzotriazole-type UV absorbents such as 2-(2-hydroxy-5-methylphenyl)benzotriazole, 2-(2-hydroxy-3,5-di-t-butylphenyl)benzotriazole, 2-(2-hydroxy-3-t-butyl-5-methylphenyl)benzotriazole, (2H-benzotriazol-2-yl)-4,6-bis(1-methyl-1-phenylethyl)phenol, etc.; benzoate-type UV absorbents such as phenyl salicylate, 2,4-di-t-butylphenyl 3,5-di-t-butyl-4-hydroxybenzoate, etc.; hindered amine-type UV absorbents such as bis(2,2,6,6-tetramethylpiperidin-4-yl) sebacate, etc.; triazine-type UV absorbents such as 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, etc. The method of mixing the UV absorbent in the vinyl copolymer resin (A) and/or the polycarbonate resin (B) is not specifically defined, for which is employable a total compounding method, a master batch dry-blending method, a total dry-blending method or the like.

Various additives may be mixed in the vinyl copolymer resin (A) and the polycarbonate resin (B) in the present invention within the range not detracting from the transparency of the resins. The additives include, for example, antioxidant, discoloration inhibitor, antistatic agent, release agent, lubricant, dye, pigment, etc. The mixing method is not specifically defined, for which is employable a total compounding method, a master batch dry-blending method, a total dry-blending method or the like.

As the method for producing the synthetic resin laminate of the present invention, employable is a coextrusion method.

The coextrusion method is not specifically defined. For example, in a feed block mode, a vinyl copolymer resin (A) layer is laminated on one side of a polycarbonate resin (B) layer using a feed block, then sheet-like extruded through a T-die and thereafter cooled while led to pass through forming rolls to give the desired synthetic resin laminate. In a multi-manifold mode, a vinyl copolymer resin (A) layer is laminated on one side of a polycarbonate resin (B) layer in a multi-manifold die, then sheet-like extruded and thereafter cooled while led to pass through forming rolls to give the desired synthetic resin laminate.

Preferably, the thickness of the synthetic resin laminate of the present invention falls within a range of from 0.1 to 10.0 mm. When the thickness is 0.1 mm or more, transfer failure or thickness accuracy failure may occur little; and when 10.0 mm or less, thickness accuracy failure or appearance failure owing to cooling unevenness after forming may occur little. More preferably, the thickness falls within a range of from 0.2 to 5.0 mm, even more preferably within a range of from 0.3 to 3.0 mm.

Preferably, the thickness of the vinyl copolymer resin (A) layer in the synthetic resin laminate of the present invention falls within a range of from 10 to 500 µm. When the thickness is less than 10 µm, then the surface hardness, the scratch resistance and the weather resistance may be poor. When more than 500 µm, then the impact resistance may be poor. Preferably, the thickness falls within a range of from 30 to 100 µm.

In the synthetic resin laminate of the present invention, the vinyl copolymer resin (A) layer, or the vinyl copolymer resin (A) layer and the polycarbonate resin (B) layer may be processed for hard coat treatment.

For the hard coat treatment, herein employable is a method of forming a hard coat layer by the use of a hard coat material capable of curing with heat energy and/or photo energy. The hard coat material capable of curing with heat energy includes, for example, a polyorganosiloxane-based or crosslinkable acrylic heat-curable resin composition, etc. The hard coat material capable of curing with photo energy includes, for example, a photocurable resin composition prepared by adding a photopolymerization initiator to a resin composition that contains a monofunctional and/or polyfunctional acrylate monomer and/or oligomer, etc.

In the present invention, the hard coat material to cure with heat energy, which is applied onto the vinyl copolymer resin (A) layer, includes, for example, a heat-curable resin composition prepared by adding from 1 to 5 parts by mass of an amine carboxylate and/or a quaternary ammonium carboxylate (a3) to 100 parts by mass of a resin composition that contains 100 parts by mass of an organotrialkoxysilane (a1) and from 50 to 200 parts by mass of a colloidal silica solution (a2) containing from 10 to 50% by mass of a colloidal silica having a particle size of from 4 to 20 nm, etc.

In the present invention, the hard coat material to cure with photo energy, which is applied onto the vinyl copolymer resin (A) layer, includes, for example, a photocurable resin composition prepared by adding from 1 to 10 parts by mass of a photopolymerization initiator (b3) to 100 parts by mass of a resin composition that comprises from 40 to 80% by mass of a tris(acryloxymethyl)isocyanurate (b1) and from 20 to 40% by mass of a bifunctional and/or trifunctional (meth)acrylate compound (b2) capable of copolymerizing with (b1), etc.

In the present invention, the hard coat material to cure with photo energy, which is applied onto the polycarbonate resin (B) layer, includes, for example, a photocurable resin composition prepared by adding from 1 to 10 parts by mass of a photopolymerization initiator (c3) to 100 parts by mass of a resin composition that contains from 20 to 60% by mass of a 1,9-nonanediol diacrylate (c1) and from 40 to 80% by mass of a compound (c2) capable of copolymerizing with (c1), that is a bifunctional or more polyfunctional (meth) acrylate monomer as well as a bifunctional or more polyfunctional urethane (meth)acrylate oligomer and/or a bifunctional or more polyfunctional polyester (meth)acrylate oligomer and/or a bifunctional or more polyfunctional epoxy (meth)acrylate oligomer, etc.

The method of coating the layer with the hard coat material is not specifically defined, for which any known method is employable here. For example, there are mentioned methods of brushing, coating with a gravure roll, dipping, casting, spraying, inkjetting or the like, as well as the methods described in Japanese Patent No. 4161182, etc.

One surface or both surfaces of the synthetic resin laminate of the present invention may be processed for at least any one treatment of antireflection treatment, antifouling treatment, antistatic treatment, weatherproof treatment and antiglare treatment. The methods of antireflection treatment, antifouling treatment, antistatic treatment, weatherproof treatment and antiglare treatment are not specifically defined, and any known method is employable here. For example, there are mentioned a method of coating with a reflection-reducing material, a method of vapor deposition of a dielectric thin film, a method of coating with an antistatic coating material, etc.

The synthetic resin laminate of the present invention is transparent, and the total light transmittance thereof is at least 80%, preferably at least 88%, more preferably at least 90%.

EXAMPLE

The present invention is described concretely with reference to the following Examples. However, the present invention is not limited at all by these Examples.

The synthetic resin laminates obtained in Examples and Comparative Examples were evaluated as follows:

<Interlayer Adhesiveness (R25 mm Bending) Test>

A test piece of the synthetic resin laminate was cut out in a size of 10 cm square, left and conditioned in the environment at a temperature of 23° C. and a relative humidity of 50% for 24 hours or more, and then pressed against a cylinder having a radius of 25 mm along the side surface thereof in such a manner that the vinyl copolymer resin (A) layer side thereof could face outside. Under the condition, those with no appearance change were determined to be good.

<High-Temperature High-Humidity Exposure Test>

A test piece of the synthetic resin laminate was cut out in a size of 10 cm square, left and conditioned in the environment at a temperature of 23° C. and a relative humidity of 50% for 24 hours or more. Then, the test piece was hung in an environment tester set at a temperature of 85° C. and a relative humidity of 85% with its corner kept as a supporting point, and kept in the condition for 72 hours. The taken-out test piece was statically left on a horizontal plane in such a manner that it could curve upwardly on the plane, and the variations of the gap length between the four corners of the test piece and the horizontal plane were summed up to evaluate the form stability of the sample.

Of the test pieces having a thickness of 1.2 mm, those of which the variation was at most 1.5 mm were determined to be good; and of the test pieces having a thickness of 0.5 mm, those of which the variation was at most 3.0 mm were determined to be good.

<Pencil Scratch Hardness Test>

According to JIS K 5600-5-4, a pencil was pressed against the surface of the vinyl copolymer resin (A) layer of the sample to be tested at an angle of 45 degrees to the surface and under a load of 750 g, and the hardness of the pencil was gradually increased. The hardness of the hardest pencil not given any scratch to the sample was taken as the pencil hardness of the sample to evaluate the sample. Of the test pieces with no hard coat treatment, those having a pencil hardness of 2H or more were determined to be good; and of the hard coat-treated test pieces, those having a pencil hardness of 3H or more were determined to be good.

<Impact Resistance Test>

A test piece of the synthetic resin laminate was cut out in a size of 80 mm square, left and conditioned in the environment at a temperature of 23° C. and a relative humidity of 50% for 24 hours or more. Then, the test piece was fixed to a circular flange having a diameter of 50 mm in such a manner that the vinyl copolymer resin (A) layer thereof could face upside, and a metal weight having a mass of 40 g or 80 g and having a tip radius of 2.5 mm was dropped down onto the vinyl copolymer resin (A) layer of the sample in such a manner that the tip part of the weight could collide against the sample. The height from the sample to the weight was gradually increased, and from the highest dropping height at which the sample did not break, the sample was evaluated for the impact resistance thereof.

Of the test pieces with no hard coat treatment or the test pieces of which one surface alone was processed for hard coat treatment, all having a thickness of 1.2 mm, those not broken at a dropping height of less than 50 cm with the weight having a mass of 80 g were determined to be good. Of the test pieces of which both surfaces were processed for hard coat treatment, having a thickness of 1.2 mm, those not broken at a dropping height of less than 50 cm with the weight having a mass of 40 g were determined to be good. Of the test pieces with no hard coat treatment or the test pieces of which one surface or both surfaces were processed for hard coat treatment, all having a thickness of 0.5 mm, those not broken at a dropping height of less than 20 cm with the weight having a mass of 40 g were determined to be good.

<Measurement of Total Light Transmittance>

Using a color/haze meter COH400 (by Nippon Denshoku Industries), the total light transmittance of the test piece was measured. Those having a total light transmittance of at least 90% were determined to be good.

Synthesis Example 1

Production of Vinyl Copolymer Resin (A1)

A monomer composition containing 77.000 mol % of purified methyl methacrylate (by Mitsubishi Gas Chemical), 22.998 mol % of purified styrene (by Wako Pure Chemical Industries) and 0.002 mol % of a polymerization initiator, t-amyl peroxy-2-ethylhexanoate (by Arkema Yoshitomi, trade name: Luperox 575) was continuously fed into a 10-liter complete mixing tank equipped with a helical ribbon blade at a feeding rate of 1 kg/hr, and continuously polymerized at a polymerization temperature of 150° C. for a mean residence time of 2.5 hours. The liquid was continuously discharged out through the bottom of the tank so that the liquid level in the polymerization tank could be all the time constant, and introduced into a solvent removal unit to give pellets of a vinyl copolymer resin (A1).

The obtained vinyl copolymer resin (A1') was dissolved in methyl isobutyrate (by Kanto Chemical) to prepare a 10 mas % methyl isobutyrate solution. 500 parts by mass of the 10 mas. % methyl isobutyrate solution of (A1') and 1 part by mass of 10 mas. % Pd/C (by NE Chemcat) were fed into a 1000-ml autoclave unit, and kept therein under a hydrogen pressure of 9 MPa at 200° C. for 15 hours to thereby hydrogenate the aromatic double bond site of the vinyl copolymer resin (A1'). The catalyst was removed by filtering, and the residue was introduced into a solvent removal unit to give pellets of a vinyl copolymer resin (A1). As a result of measurement through $^1$H-NMR, the proportion of the methyl methacrylate structural unit in the vinyl copolymer resin (A1) was 75 mol %. As a result of absorptiometry at a wavelength of 260 nm, the hydrogenation ratio at the aromatic double bond site was 99%. The weight-average molecular weight (equivalent to standard polystyrene) of the resin, as measured through gel permeation chromatography, was 125,000.

Synthesis Example 2

Production of Vinyl Copolymer Resin (A2)

A vinyl copolymer resin (A2) was produced in the same manner as in Synthesis Example 1 except that the amount of methyl methacrylate used in Synthesis Example 1 was changed to 50.000 mol % and the amount of styrene was to 49.998 mol %. As a result of measurement through $^1$H-NMR, the proportion of the methyl methacrylate structural unit in the vinyl copolymer resin (A2) was 48 mol %. As a result of absorptiometry at a wavelength of 260 nm, the hydrogenation ratio at the aromatic double bond site was 99%. The weight-average molecular weight (equivalent to standard polystyrene) of the resin, as measured through gel permeation chromatography, was 170,000.

Synthesis Example 3

Production of Vinyl Copolymer Resin (A3)

A vinyl copolymer resin (A3) was produced in the same manner as in Synthesis Example 1 except that the amount of methyl methacrylate used in Synthesis Example 1 was changed to 60.019 mol % and the amount of styrene was to 39.979 mol %. As a result of measurement through $^1$H-NMR, the proportion of the methyl methacrylate structural unit in the vinyl copolymer resin (A3) was 58 mol %. As a result of absorptiometry at a wavelength of 260 nm, the hydrogenation ratio at the aromatic double bond site was 99%. The weight-average molecular weight (equivalent to standard polystyrene) of the resin, as measured through gel permeation chromatography, was 155,000.

Synthesis Example 4

Production of Vinyl Copolymer Resin (A4)

A vinyl copolymer resin (A4) was produced in the same manner as in Synthesis Example 1 except that the amount of methyl methacrylate used in Synthesis Example 1 was changed to 92.000 mol % and the amount of styrene was to 7.998 mol %. As a result of measurement through $^1$H-NMR, the proportion of the methyl methacrylate structural unit in the vinyl copolymer resin (A4) was 90 mol %. As a result of absorptiometry at a wavelength of 260 nm, the hydrogenation ratio at the aromatic double bond site was 99%. The weight-average molecular weight (equivalent to standard polystyrene) of the resin, as measured through gel permeation chromatography, was 120,000.

Synthesis Example 5

Production of Heat-Curable Resin Composition (a)
for Hard Coat to Coat Vinyl Copolymer Resin (A)
Layer 100 parts by mass of methyltrimethoxysilane and 1 part by mass of acetic acid were put and mixed in a mixing tank equipped with a stirring blade and a dropping unit, cooled in an ice/water bath and stirred while kept at 0 to 10° C. Next, 84 parts by mass of a 30 mas. % solution of colloidal silica having a mean particle size of from 10 to 20 nm (Nissan Chemical Industry's trade name: Snowtex 30) was dropwise added thereto and stirred for 4 hours while kept at 10° C. Further, 84 parts by mass of a 25 to 26 mas. % solution of colloidal silica having a mean particle size of from 10 to 20 nm (Nissan Chemical Industry's trade name: Snowtex IBA-ST) was dropwise added thereto, and stirred for 50 hours while kept at 20° C. A mixture containing 45 parts by mass of cellosolve acetate, 50 parts by mass of isobutyl alcohol and 0.02 parts by mass of polyoxyalkylene glycol dimethylsiloxane copolymer (Shin-etsu Chemical Industry's trade name: KP-341) was dropwise added thereto and mixed while kept at 25° C., taking 1 hour. 2,4-Dihydroxybenzophenone was added thereto in an amount of 10 parts by mass relative to 100 parts by mass of the resin fraction thereby giving a thermosetting resin composition (a) for hard coat.

Synthesis Example 6

Production of Photocurable Resin Composition (b)
for Hard Coat to Coat Vinyl Copolymer Resin (A)
Layer A mixture containing 60 parts by mass of tris(2-acryloxyethyl)isocyanurate (by Aldrich), 40 parts by mass of neopentylglycol oligoacrylate (Osaka Organic Chemical Industry's trade name: 215D), 1 part by mass of 2,4,6-trimethylbenzoyldiphenylphosphine oxide (Ciba Japan's trade name: DAROCUR TPO), 0.3 parts by mass of 1-hydroxycyclohexyl phenyl ketone (by Aldrich) and 1 part by mass of 2-(2H-benzotriazol-2-yl)-4,6-bis(1-methyl-1-phenylethyl)phenol (Ciba Japan's trade name: TINUVIN 234) was introduced into a mixing tank equipped with a stirring blade, and stirred for 1 hour while kept at 40° C. to prepare a photocurable resin composition (b) for hard coat.

Synthesis Example 7

Production of Photocurable Resin Composition (c)
for Hard Coat to Coat Polycarbonate Resin (B)
Layer A mixture containing 40 parts by mass of 1,9-nonanediol diacrylate (Osaka Organic Chemical Industry's trade name: Biscoat #260), 40 parts by mass of hexafunctional urethane acrylate oligomer (Shin-Nakamura Chemical Industry's trade name: U-6HA), 20 parts by mass of succinic acid/trimethylolethane/acrylic acid condensation product (1/2/4 by mol), 2.8 parts by mass of 2,4,6-trimethylbenzoyldiphenylphosphine oxide (Ciba Japan's trade name: DAROCUR TPO), 1 part by mass of benzophenone (by Aldrich) and 1 part by mass of 2-(2H-benzotriazol-2-yl)-4,6-bis(1-methyl-1-phenylethyl)phenol (Ciba Japan's trade name: TINUVIN 234) was introduced into a mixing tank equipped with a stirring blade, and stirred for 1 hour while kept at 40° C. to prepare a photocurable resin composition (c) for hard coat.

Example 1

Using a multilayer extrusion apparatus having a single-screw extruder with a screw diameter of 35 mm, a single-screw extruder with a screw diameter of 65 mm, a feed block connected to all the extruders and a T-die connected to the feed block, a synthetic resin laminate was produced. The vinyl copolymer resin (A1) obtained in Synthesis Example 1 was continuously introduced into the single-screw extruder with a screw diameter of 35 mm, and extruded out under the condition of a cylinder temperature of 240° C. and an ejection rate of 2.6 kg/hr. A polycarbonate resin (B) (Mitsubishi Engineering Plastics' trade name: Iupilon S-1000) was continuously introduced into the single-screw extruder with a screw diameter of 65 mm, and extruded out at a cylinder temperature of 280° C. and at an ejection rate of 50.0 kg/hr. The feed block connected to all the extruders was equipped with a two-type two-layer distribution pin, into which the vinyl copolymer resin (A1) and the polycarbonate resin (B) at a temperature of 270° C. were introduced and laminated. Though the T-die at a temperature of 270° C., as connected ahead, this was sheet-like extruded, and cooled with three mirror-surface finishing rolls at a temperature of 120° C., 130° C. and 190° C. from the upstream side, while the mirror surface was transferred onto it, thereby giving a laminate (D1) of the vinyl copolymer resin (A1) layer and the polycarbonate resin (B) layer. The thickness of the obtained laminate was 1.2 mm, and the thickness of the vinyl copolymer resin (A1) layer was 60 μm at around the center thereof.

In the R 25 mm bending test, the result was no change and was good; in the high-temperature high-humidity exposure test, the result was 0.9 mm and was good; in the pencil scratch hardness test, the result was 2H and was good; in the impact resistance test, the result was 70 cm and was good; and the total light transmittance of the laminate was 91% and was good. As the comprehensive determination thereof, the laminate was good.

Example 2

A laminate (D2) of the vinyl copolymer resin (A1) layer and the polycarbonate resin (B) layer was produced in the same manner as in Example 1 except that the ejection rate of the vinyl copolymer resin (A1) used in Example 1 was changed to 4.8 kg/hr and that of the polycarbonate resin (B) was to 35 kg/hr. The thickness of the obtained laminate was 0.5 mm, and the thickness of the vinyl copolymer resin (A1) layer was 60 μm at around the center thereof.

In the R 25 mm bending test, the result was no change and was good; in the high-temperature high-humidity exposure test, the result was 0.5 mm and was good; in the pencil scratch hardness test, the result was 2H and was good; in the impact resistance test, the result was 30 cm and was good; and the total light transmittance of the laminate was 91% and was good. As the comprehensive determination thereof, the laminate was good.

Example 3

Using a bar coater, the heat-curable resin composition (a) for hard coat obtained in Synthesis Example 5 was applied onto the vinyl copolymer resin (A1) layer of the laminate (D1) obtained in Example 1 in such a manner that the coating thickness after curing could be from 3 to 8 μm, then dried at 25° C. for 15 minutes, and then cured for 1 hour in a hot air circulating drier set at 130° C., thereby giving a laminate (E1) having a hard coat on the vinyl copolymer resin (A1) layer.

In the R 25 mm bending test, the result was no change and was good; in the high-temperature high-humidity exposure test, the result was 1.2 mm and was good; in the pencil scratch hardness test, the result was 3H and was good; in the impact resistance test, the result was 60 cm and was good; and the total light transmittance of the laminate was 91% and was good. As the comprehensive determination thereof, the laminate was good.

Example 4

Using a bar coater, the photocurable resin composition (b) for hard coat obtained in Synthesis Example 6 was applied onto the vinyl copolymer resin (A1) layer of the laminate (D1) obtained in Example 1 in such a manner that the coating thickness after curing could be from 3 to 8 μm. After covered with a PET film under pressure, this was irradiated with UV rays under the condition of a line speed of 1.5 m/min on a conveyor equipped with a high-pressure mercury lamp having an output power of 80 W/cm and having a light source distance from the laminate of 12 cm, thereby curing the photocurable resin composition (b) for hard coat. The PET film was peeled off to give a laminate (E2) having a hard coat on the vinyl copolymer resin (A1) layer.

In the R 25 mm bending test, the result was no change and was good; in the high-temperature high-humidity exposure test, the result was 1.3 mm and was good; in the pencil scratch hardness test, the result was 4H and was good; in the impact resistance test, the result was 60 cm and was good; and the total light transmittance of the laminate was 91% and was good. As the comprehensive determination thereof, the laminate was good.

Example 5

Using a bar coater, the photocurable resin composition (b) for hard coat obtained in Synthesis Example 6 was applied onto the vinyl copolymer resin (A1) layer of the laminate (D1) obtained in Example 1 in such a manner that the coating thickness after curing could be from 3 to 8 μm. After this was covered with a PET film under pressure, the photocurable resin composition (c) for hard coat obtained in Synthesis Example 7 was applied onto the polycarbonate resin (B) layer of the laminate (D1) in such a manner that the coating thickness after curing could be from 3 to 8 μm, and this was covered with a PET film under pressure. This was irradiated with UV rays under the condition of a line speed of 1.5 m/min on a conveyor equipped with a high-pressure mercury lamp having an output power of 80 W/cm and having a light source distance from the laminate of 12 cm, thereby curing the photocurable resin compositions (b) and (c) for hard coat. The PET film was peeled off to give a laminate (E3) having a hard coat on the vinyl copolymer resin (A1) layer and on the polycarbonate resin (B) layer.

In the R 25 mm bending test, the result was no change and was good; in the high-temperature high-humidity exposure test, the result was 1.0 mm and was good; in the pencil scratch hardness test, the result was 4H and was good; in the impact resistance test, the result was 60 cm and was good; and the total light transmittance of the laminate was 91% and was good. As the comprehensive determination thereof, the laminate was good.

Example 6

A laminate (E4) having a hard coat on the vinyl copolymer resin (A1) layer was produced in the same manner as in Example 3 except that the laminate (D2) obtained in Example 2 was used in place of the laminate (D1) used in Example 3.

In the R 25 mm bending test, the result was no change and was good; in the high-temperature high-humidity exposure test, the result was 2.2 mm and was good; in the pencil scratch hardness test, the result was 3H and was good; in the impact resistance test, the result was 30 cm and was good;

and the total light transmittance of the laminate was 91% and was good. As the comprehensive determination thereof, the laminate was good.

Example 7

A laminate (E5) having a hard coat on the vinyl copolymer resin (A1) layer was produced in the same manner as in Example 4 except that the laminate (D2) obtained in Example 2 was used in place of the laminate (D1) used in Example 4.

In the R 25 mm bending test, the result was no change and was good; in the high-temperature high-humidity exposure test, the result was 2.2 mm and was good; in the pencil scratch hardness test, the result was 4H and was good; in the impact resistance test, the result was 30 cm and was good; and the total light transmittance of the laminate was 91% and was good. As the comprehensive determination thereof, the laminate was good.

Example 8

A laminate (E6) having a hard coat on the vinyl copolymer resin (A) layer and the polycarbonate resin (B) layer was produced in the same manner as in Example 5 except that the laminate (D2) obtained in Example 2 was used in place of the laminate (D1) used in Example 5.

In the R 25 mm bending test, the result was no change and was good; in the high-temperature high-humidity exposure test, the result was 2.1 mm and was good; in the pencil scratch hardness test, the result was 4H and was good; in the impact resistance test, the result was 30 cm and was good; and the total light transmittance of the laminate was 91% and was good. As the comprehensive determination thereof, the laminate was good.

Comparative Example 1

A laminate (D3) of the vinyl copolymer resin (A2) layer and the polycarbonate resin (B) layer was produced in the same manner as in Example 1 except that the vinyl copolymer resin (A2) obtained in Synthesis Example 2 was used in place of the vinyl copolymer resin (A1) used in Example 1. The thickness of the obtained laminate was 1.2 mm, and the thickness of the vinyl copolymer resin (A2) layer was 60 µm at around the center thereof.

In the high-temperature high-humidity exposure test, the result was 0.5 mm and was good; in the impact resistance test, the result was 60 cm and was good; and the total light transmittance of the laminate was 91% and was good. However, in the R 25 mm bending test, the laminate cracked and delaminated and was not good; in the pencil scratch hardness test, the result was H and was also not good; and as the comprehensive determination thereof, the laminate was not good.

Comparative Example 2

A laminate (D4) of the vinyl copolymer resin (A2) layer and the polycarbonate resin (B) layer was produced in the same manner as in Example 2 except that the vinyl copolymer resin (A2) obtained in Synthesis Example 2 was used in place of the vinyl copolymer resin (A1) used in Example 2. The thickness of the obtained laminate was 0.5 mm, and the thickness of the vinyl copolymer resin (A2) layer was 60 µm at around the center thereof.

In the high-temperature high-humidity exposure test, the result was 1.2 mm and was good; in the impact resistance test, the result was 30 cm and was good; and the total light transmittance of the laminate was 91% and was good. However, in the R 25 mm bending test, the laminate cracked and delaminated and was not good; in the pencil scratch hardness test, the result was H and was also not good; and as the comprehensive determination thereof, the laminate was not good.

Comparative Example 3

A laminate (E7) having a hard coat on the vinyl copolymer resin (A2) layer and the polycarbonate resin (B) layer was produced in the same manner as in Example 5 except that the laminate (D3) obtained in Comparative Example 1 was used in place of the laminate (D1) used in Example 5.

In the high-temperature high-humidity exposure test, the result was 0.5 mm and was good; in the pencil scratch hardness test, the result was 3H and was good; in the impact resistance test, the result was 60 cm and was good; and the total light transmittance of the laminate was 91% and was good. However, in the R 25 mm bending test, the laminate cracked and delaminated and was not good; and as the comprehensive determination thereof, the laminate was not good.

Comparative Example 4

A laminate (D5) of the vinyl copolymer resin (A3) layer and the polycarbonate resin (B) layer was produced in the same manner as in Example 1 except that the vinyl copolymer resin (A3) obtained in Synthesis Example 3 was used in place of the vinyl copolymer resin (A1) used in Example 1. The thickness of the obtained laminate was 1.2 mm, and the thickness of the vinyl copolymer resin (A3) layer was 60 µm at around the center thereof.

In the high-temperature high-humidity exposure test, the result was 0.4 mm and was good; in the impact resistance test, the result was 60 cm and was good; and the total light transmittance of the laminate was 91% and was good. However, in the R 25 mm bending test, the laminate cracked and delaminated and was not good; in the pencil scratch hardness test, the result was H and was also not good; and as the comprehensive determination thereof, the laminate was not good.

Comparative Example 5

A laminate (D6) of the vinyl copolymer resin (A3) layer and the polycarbonate resin (B) layer was produced in the same manner as in Example 2 except that the vinyl copolymer resin (A3) obtained in Synthesis Example 3 was used in place of the vinyl copolymer resin (A1) used in Example 2. The thickness of the obtained laminate was 0.5 mm, and the thickness of the vinyl copolymer resin (A3) layer was 60 µm at around the center thereof.

In the high-temperature high-humidity exposure test, the result was 1.4 mm and was good; in the impact resistance test, the result was 30 cm and was good; and the total light transmittance of the laminate was 91% and was good. However, in the R 25 mm bending test, the laminate cracked and delaminated and was not good; in the pencil scratch hardness test, the result was H and was also not good; and as the comprehensive determination thereof, the laminate was not good.

Comparative Example 6

A laminate (E8) having a hard coat on the vinyl copolymer resin (A3) layer and the polycarbonate resin (B) layer was produced in the same manner as in Example 5 except that the laminate (D5) obtained in Comparative Example 4 was used in place of the laminate (D1) used in Example 5.

In the high-temperature high-humidity exposure test, the result was 0.6 mm and was good; in the pencil scratch hardness test, the result was 3H and was good; in the impact resistance test, the result was 60 cm and was good; and the total light transmittance of the laminate was 91% and was good. However, in the R 25 mm bending test, the laminate cracked and delaminated and was not good; and as the comprehensive determination thereof, the laminate was not good.

Comparative Example 7

A laminate (D7) of the vinyl copolymer resin (A4) layer and the polycarbonate resin (B) layer was produced in the same manner as in Example 1 except that the vinyl copolymer resin (A4) obtained in Synthesis Example 4 was used in place of the vinyl copolymer resin (A1) used in Example 1. The thickness of the obtained laminate was 1.2 mm, and the thickness of the vinyl copolymer resin (A4) layer was 60 μm at around the center thereof.

In the R 25 mm bending test, the result was no change and was good; in the pencil scratch hardness test, the result was 2H and was good; in the impact resistance test, the result was 90 cm and was good; and the total light transmittance of the laminate was 91% and was good. However, in the high-temperature high-humidity exposure test, the result was 2.0 mm and was not good; and as the comprehensive determination thereof, the laminate was not good.

Comparative Example 8

A laminate (D8) of the vinyl copolymer resin (A4) layer and the polycarbonate resin (B) layer was produced in the same manner as in Example 2 except that the vinyl copolymer resin (A4) obtained in Synthesis Example 4 was used in place of the vinyl copolymer resin (A1) used in Example 2. The thickness of the obtained laminate was 0.5 mm, and the thickness of the vinyl copolymer resin (A4) layer was 60 μm at around the center thereof.

In the R 25 mm bending test, the result was no change and was good; in the pencil scratch hardness test, the result was 2H and was good; in the impact resistance test, the result was 30 cm and was good; and the total light transmittance of the laminate was 91% and was good. However, in the high-temperature high-humidity exposure test, the result was 6.0 mm and was not good; and as the comprehensive determination thereof, the laminate was not good.

Comparative Example 9

A laminate (E9) having a hard coat on the vinyl copolymer resin (A4) layer was produced in the same manner as in Example 4 except that the laminate (D7) obtained in Comparative Example 7 was used in place of the laminate (D1) used in Example 4.

In the R 25 mm bending test, the result was no change and was good; in the pencil scratch hardness test, the result was 4H and was good; in the impact resistance test, the result was 80 cm and was good; and the total light transmittance of the laminate was 91% and was good. However, in the high-temperature high-humidity exposure test, the result was 3.4 mm and was not good; and as the comprehensive determination thereof, the laminate was not good.

Comparative Example 10

A laminate (E10) having a hard coat on the vinyl copolymer resin (A4) layer and the polycarbonate resin (B) layer was produced in the same manner as in Example 5 except that the laminate (D7) obtained in Comparative Example 7 was used in place of the laminate (D1) used in Example 5.

In R 25 mm bending test, the result was no change and was good; in the pencil scratch hardness test, the result was 4H and was good; in the impact resistance test, the result was 60 cm and was good; and the total light transmittance of the laminate was 91% and was good. However, in the high-temperature high-humidity exposure test, the result was 3.0 mm and was not good; and as the comprehensive determination thereof, the laminate was not good.

Comparative Example 11

A laminate (E11) having a hard coat on the vinyl copolymer resin (A4) layer was produced in the same manner as in Example 4 except that the laminate (D8) obtained in Comparative Example 8 was used in place of the laminate (D1) used in Example 4.

In R 25 mm bending test, the result was no change and was good; in the pencil scratch hardness test, the result was 4H and was good; in the impact resistance test, the result was 30 cm and was good; and the total light transmittance of the laminate was 91% and was good. However, in the high-temperature high-humidity exposure test, the result was 7.8 mm and was not good; and as the comprehensive determination thereof, the laminate was not good.

Comparative Example 12

A laminate (E12) having a hard coat on the vinyl copolymer resin (A4) layer and the polycarbonate resin (B) layer was produced in the same manner as in Example 5 except that the laminate (D8) obtained in Comparative Example 8 was used in place of the laminate (D1) used in Example 5.

In R 25 mm bending test, the result was no change and was good; in the pencil scratch hardness test, the result was 4H and was good; in the impact resistance test, the result was 30 cm and was good; and the total light transmittance of the laminate was 91% and was good. However, in the high-temperature high-humidity exposure test, the result was 7.5 mm and was not good; and as the comprehensive determination thereof, the laminate was not good.

Comparative Example 13

A laminate (D9) of a polymethyl methacrylate resin (A5) layer and the polycarbonate resin (B) layer was produced in the same manner as in Example 1 except that a polymethyl methacrylate resin (A5) (ARKEMA's trade name: ALTUGLAS V020) was used in place of the vinyl copolymer resin (A1) used in Example 1. The thickness of the obtained laminate was 1.2 mm, and the thickness of the polymethyl methacrylate resin (A5) layer was 60 μm at around the center thereof.

In the R 25 mm bending test, the result was no change and was good; in the pencil scratch hardness test, the result was 3H and was good; in the impact resistance test, the result was 120 cm and was good; and the total light transmittance of the laminate was 91% and was good. However, in the high-temperature high-humidity exposure test, the result was 3.9 mm and was not good; and as the comprehensive determination thereof, the laminate was not good.

Comparative Example 14

A laminate (D10) of a polymethyl methacrylate resin (A5) layer and the polycarbonate resin (B) layer was produced in the same manner as in Example 2 except that a polymethyl methacrylate resin (A5) (ARKEMA's trade name: ALTUGLAS V020) was used in place of the vinyl copolymer resin (A1) used in Example 2. The thickness of the obtained laminate was 0.5 mm, and the thickness of the polymethyl methacrylate resin (A5) layer was 60 µm at around the center thereof.

In the R 25 mm bending test, the result was no change and was good; in the pencil scratch hardness test, the result was 3H and was good; in the impact resistance test, the result was 30 cm and was good; and the total light transmittance of the laminate was 92% and was good. However, in the high-temperature high-humidity exposure test, the result was 12.3 mm and was not good; and as the comprehensive determination thereof, the laminate was not good.

Comparative Example 15

A laminate (E13) having a hard coat on the polymethyl methacrylate resin (A5) layer was produced in the same manner as in Example 4 except that the laminate (D9) obtained in Comparative Example 13 was used in place of the laminate (D1) used in Example 4.

In R 25 mm bending test, the result was no change and was good; in the pencil scratch hardness test, the result was 4H and was good; in the impact resistance test, the result was 100 cm and was good; and the total light transmittance of the laminate was 91% and was good. However, in the high-temperature high-humidity exposure test, the result was 6.0 mm and was not good; and as the comprehensive determination thereof, the laminate was not good.

Comparative Example 16

A laminate (E14) having a hard coat on the polymethyl methacrylate resin (A5) layer and the polycarbonate resin (B) layer was produced in the same manner as in Example 5 except that the laminate (D9) obtained in Comparative Example 13 was used in place of the laminate (D1) used in Example 5.

In R 25 mm bending test, the result was no change and was good; in the pencil scratch hardness test, the result was 4H and was good; in the impact resistance test, the result was 60 cm and was good; and the total light transmittance of the laminate was 91% and was good. However, in the high-temperature high-humidity exposure test, the result was 5.3 mm and was not good; and as the comprehensive determination thereof, the laminate was not good.

Comparative Example 17

A laminate (E15) having a hard coat on the polymethyl methacrylate resin (A5) layer was produced in the same manner as in Example 4 except that the laminate (D10) obtained in Comparative Example 14 was used in place of the laminate (D1) used in Example 4.

In R 25 mm bending test, the result was no change and was good; in the pencil scratch hardness test, the result was 4H and was good; in the impact resistance test, the result was 30 cm and was good; and the total light transmittance of the laminate was 92% and was good. However, in the high-temperature high-humidity exposure test, the result was 19.2 mm and was not good; and as the comprehensive determination thereof, the laminate was not good.

Comparative Example 18

A laminate (E16) having a hard coat on the polymethyl methacrylate resin (A5) layer and the polycarbonate resin (B) layer was produced in the same manner as in Example 5 except that the laminate (D10) obtained in Comparative Example 14 was used in place of the laminate (D1) used in Example 5.

In R 25 mm bending test, the result was no change and was good; in the pencil scratch hardness test, the result was 4H and was good; in the impact resistance test, the result was 30 cm and was good; and the total light transmittance of the laminate was 92% and was good. However, in the high-temperature high-humidity exposure test, the result was 18.1 mm and was not good; and as the comprehensive determination thereof, the laminate was not good.

Comparative Example 19

A laminate (D11) with a polymethyl methacrylate resin (A5) layer laminated on both surfaces of the polycarbonate resin (B) layer was produced in the same manner as in Example 1 except that a polymethyl methacrylate resin (A5) (ARKEMA's trade name: ALTUGLAS V020) was used in place of the vinyl copolymer resin (A1) used in Example 1, that the ejection rate of the polymethyl methacrylate resin (A5) was 5.2 kg/hr and the ejection rate of the polycarbonate resin (B) was 46.8 kg/hr, and that the feed block was equipped with a two-type three-layer distribution pin. The thickness of the obtained laminate was 1.2 mm, and the thickness of the polymethyl methacrylate resin (A5) layer was 60 µm at around the center thereof.

In the R 25 mm bending test, the result was no change and was good; in the high-temperature high-humidity exposure test, the result was 0.5 mm and was good; in the pencil scratch hardness test, the result was 3H and was good; and the total light transmittance of the laminate was 91% and was good. However, in the impact resistance test, the result was 40 cm and was not good; and as the comprehensive determination thereof, the laminate was not good.

Comparative Example 20

A laminate (D12) with a polymethyl methacrylate resin (A5) layer laminated on both surfaces of the polycarbonate resin (B) layer was produced in the same manner as in Example 1 except that a polymethyl methacrylate resin (A5) (ARKEMA's trade name: ALTUGLAS V020) was used in place of the vinyl copolymer resin (A1) used in Example 1, that the ejection rate of the polymethyl methacrylate resin (A5) was 9.6 kg/hr and the ejection rate of the polycarbonate resin (B) was 30.4 kg/hr, and that the feed block was equipped with a two-type three-layer distribution pin. The thickness of the obtained laminate was 0.5 mm, and the thickness of the polymethyl methacrylate resin (A5) layer was 60 µm at around the center thereof.

In the R 25 mm bending test, the result was no change and was good; in the high-temperature high-humidity exposure test, the result was 1.1 mm and was good; in the pencil scratch hardness test, the result was 3H and was good; and the total light transmittance of the laminate was 92% and was good. However, in the impact resistance test, the result was 10 cm and was not good; and as the comprehensive determination thereof, the laminate was not good.

Comparative Example 21

Using a bar coater, the photocurable resin composition (b) for hard coat obtained in Synthesis Example 6 was applied onto one polymethyl methacrylate resin (A5) layer of the laminate (D11) obtained in Comparative Example 19 in such a manner that the coating thickness after curing could be from 3 to 8 μm. After covered with a PET film under pressure, this was irradiated with UV rays under the condition of a line speed of 1.5 m/min on a conveyor equipped with a high-pressure mercury lamp having an output power of 80 W/cm and having a light source distance from the laminate of 12 cm, thereby curing the photocurable resin composition (b) for hard coat. The PET film was peeled off to give a laminate (E17) having a hard coat on one polymethyl methacrylate resin (A5) layer.

In the R 25 mm bending test, the result was no change and was good; in the high-temperature high-humidity exposure test, the result was 0.7 mm and was good; in the pencil scratch hardness test, the result was 4H and was good; and the total light transmittance of the laminate was 91% and was good. However, in the impact resistance test, the result was 10 cm and was not good; and as the comprehensive determination thereof, the laminate was not good.

As in Table 1, the synthetic resin laminates of the present invention are excellent in interlayer adhesiveness, form stability in high-temperature high-humidity environments, surface hardness and impact resistance.

TABLE 1

| | Layer Configuration | Thickness (μm) | Hard Coat Layer (A) | Hard Coat Layer (B) | Interlayer Adhesiveness | High-Temperature High-Humidity Exposure R25 Bending | Form Stability | Pencil Hardness Surface Hardness of Layer (A) | Impact Resistance Mass of Weight | Impact Resistance Maximum Height | Transparency Total Light Transmittance | Comprehensive Determination |
|---|---|---|---|---|---|---|---|---|---|---|---|---|
| Example 1 | resin A1/PC | 60/1140 | no | no | good | 0.9 mm | good | 2H | 80 g | 70 cm good | 91% | good |
| Example 2 | resin A1/PC | 60/440 | no | no | good | 0.5 mm | good | 2H | 40 g | 30 cm good | 91% | good |
| Example 3 | resin A1/PC | 60/1140 | (a) | no | good | 1.2 mm | good | 3H | 80 g | 60 cm good | 91% | good |
| Example 4 | resin A1/PC | 60/1140 | (b) | no | good | 1.3 mm | good | 4H | 80 g | 60 cm good | 91% | good |
| Example 5 | resin A1/PC | 60/1140 | (b) | (c) | good | 1.0 mm | good | 4H | 40 g | 60 cm good | 91% | good |
| Example 6 | resin A1/PC | 60/440 | (a) | no | good | 2.2 mm | good | 3H | 40 g | 30 cm good | 91% | good |
| Example 7 | resin A1/PC | 60/440 | (b) | no | good | 2.2 mm | good | 4H | 40 g | 30 cm good | 91% | good |
| Example 8 | resin A1/PC | 60/440 | (b) | (c) | good | 2.1 mm | good | 4H | 40 g | 30 cm good | 91% | good |
| Comparative Example 1 | resin A2/PC | 60/1140 | no | no | no good | 0.5 mm | good | H | 80 g | 60 cm good | 91% | no good |
| Comparative Example 2 | resin A2/PC | 60/440 | no | no | no good | 1.2 mm | good | H | 40 g | 30 cm good | 91% | no good |
| Comparative Example 3 | resin A2/PC | 60/1140 | (b) | (c) | no good | 0.5 mm | good | 3H | 40 g | 60 cm good | 91% | no good |
| Comparative Example 4 | resin A3/PC | 60/1140 | no | no | no good | 0.4 mm | good | H | 80 g | 60 cm good | 91% | no good |
| Comparative Example 5 | resin A3/PC | 60/440 | no | no | no good | 1.4 mm | good | H | 40 g | 30 cm good | 91% | no good |
| Comparative Example 6 | resin A3/PC | 60/1140 | (b) | (c) | no good | 0.6 mm | good | 3H | 40 g | 60 cm good | 91% | no good |
| Comparative Example 7 | resin A4/PC | 60/1140 | no | no | good | 2.0 mm | no good | 2H | 80 g | 90 cm good | 91% | no good |
| Comparative Example 8 | resin A4/PC | 60/440 | no | no | good | 6.0 mm | no good | 2H | 40 g | 30 cm good | 91% | no good |
| Comparative Example 9 | resin A4/PC | 60/1140 | (b) | no | good | 3.4 mm | no good | 4H | 80 g | 80 cm good | 91% | no good |
| Comparative Example 10 | resin A4/PC | 60/1140 | (b) | (c) | good | 3.0 mm | no good | 4H | 40 g | 60 cm good | 91% | no good |
| Comparative Example 11 | resin A4/PC | 60/440 | (b) | no | good | 7.8 mm | no good | 4H | 40 g | 30 cm good | 91% | no good |
| Comparative Example 12 | resin A4/PC | 60/440 | (b) | (c) | good | 7.5 mm | no good | 4H | 40 g | 30 cm good | 91% | no good |
| Comparative Example 13 | PMMA/PC | 60/1140 | no | no | good | 3.9 mm | no good | 3H | 80 g | 120 cm good | 91% | no good |
| Comparative Example 14 | PMMA/PC | 60/440 | no | no | good | 12.3 mm | no good | 3H | 40 g | 30 cm good | 92% | no good |
| Comparative Example 15 | PMMA/PC | 60/1140 | (b) | no | good | 6.0 mm | no good | 4H | 80 g | 100 cm good | 91% | no good |
| Comparative Example 16 | PMMA/PC | 60/1140 | (b) | (c) | good | 5.3 mm | no good | 4H | 40 g | 60 cm good | 91% | no good |

TABLE 1-continued

| | Layer Configuration | Thickness (μm) | Hard Coat Layer (A) | Hard Coat Layer (B) | Interlayer Adhesiveness R25 Bending | High-Temperature High-Humidity Exposure Form Stability | Pencil Hardness Surface Hardness of Layer (A) | Impact Resistance Mass of Weight | Impact Resistance Maximum Height | Transparency Total Light Transmittance | Comprehensive Determination |
|---|---|---|---|---|---|---|---|---|---|---|---|
| Comparative Example 17 | PMMA/PC | 60/440 | (b) | no | good | 19.2 mm no good | 4H | 40 g | 30 cm good | 92% | no good |
| Comparative Example 18 | PMMA/PC | 60/440 | (b) | (c) | good | 18.1 mm no good | 4H | 40 g | 30 cm good | 92% | no good |
| Comparative Example 19 | PMMA/PC/ PMMA | 60/1080/ 60 | no | no | good | 0.5 mm good | 3H | 80 g | 40 cm no good | 91% | no good |
| Comparative Example 20 | PMMA/PC/ PMMA | 60/380/ 60 | no | no | good | 1.1 mm good | 3H | 40 g | 10 cm no good | 92% | no good |
| Comparative Example 21 | PMMA/PC/ PMMA | 60/1080/ 60 | one (b) | no | good | 0.7 mm good | 4H | 40 g | 10 cm no good | 91% | no good |

PMMA: polymethyl methacrylate resin, PC: polycarbonate resin

INDUSTRIAL APPLICABILITY

The thermoplastic resin laminate of the present invention have characteristics in that it is excellent in interlayer adhesiveness, form stability in high-temperature and high humidity environments, surface hardness and impact resistance, and is favorably used for transparent substrate materials, transparent protective materials, etc. In particular, the laminate is favorably used for display panel plates of OA instruments and portable electronic instruments.

The invention claimed is:

1. A synthetic resin laminate having a vinyl copolymer resin (A) layer and a polycarbonate resin (B) layer, in which the vinyl copolymer resin (A) layer is directly laminated on one surface of the polycarbonate resin (B) layer,
and in which a vinyl copolymer resin (A) comprises a methyl methacrylate structural unit (a) and an aliphatic vinyl structural unit (b) represented by the following general formula (1), and the proportion of the methyl methacrylate structural unit (a) is from 70 to 80 mol % relative to the total of all the structural units in (A):

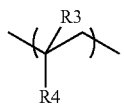

(2)

wherein, in the formula, R3 represents a hydrogen atom; R4 represents a cyclohexyl group $C_6H_{11}$, wherein the vinyl copolymer resin (A) is one obtained through polymerization of methyl methacrylate monomer and styrene monomer followed by hydrogenation of 99% of the aromatic double bonds derived from the styrene monomer.

2. The synthetic resin laminate according to claim 1, wherein the vinyl copolymer resin (A) and/or a polycarbonate resin (B) comprise a UV absorbent.

3. The synthetic resin laminate according to claim 1, wherein the vinyl copolymer resin (A) layer is processed for hard coat treatment.

4. The synthetic resin laminate according to claim 1, wherein the vinyl copolymer resin (A) layer and the polycarbonate resin (B) layer are processed for hard coat treatment.

5. The synthetic resin laminate according to claim 1, of which one surface or both surfaces are processed for at least one treatment selected from antireflection treatment, antifouling treatment, antistatic treatment, weatherproof treatment and antiglare treatment.

6. A transparent substrate material comprising the synthetic resin laminate of claim 1.

7. A transparent protective material comprising the synthetic resin laminate of claim 1.

\* \* \* \* \*

UNITED STATES PATENT AND TRADEMARK OFFICE
CERTIFICATE OF CORRECTION

PATENT NO. : 9,731,481 B2
APPLICATION NO. : 13/697882
DATED : August 15, 2017
INVENTOR(S) : H. Oguro et al.

Page 1 of 1

It is certified that error appears in the above-identified patent and that said Letters Patent is hereby corrected as shown below:

In the Claims

Column 23, Line 44 (Claim 1, Line 11), next to the structure, "(2)" should be -- (1) --

Signed and Sealed this
Twenty-seventh Day of February, 2018

Andrei Iancu
*Director of the United States Patent and Trademark Office*